Figures 1, 2, 3, 4:
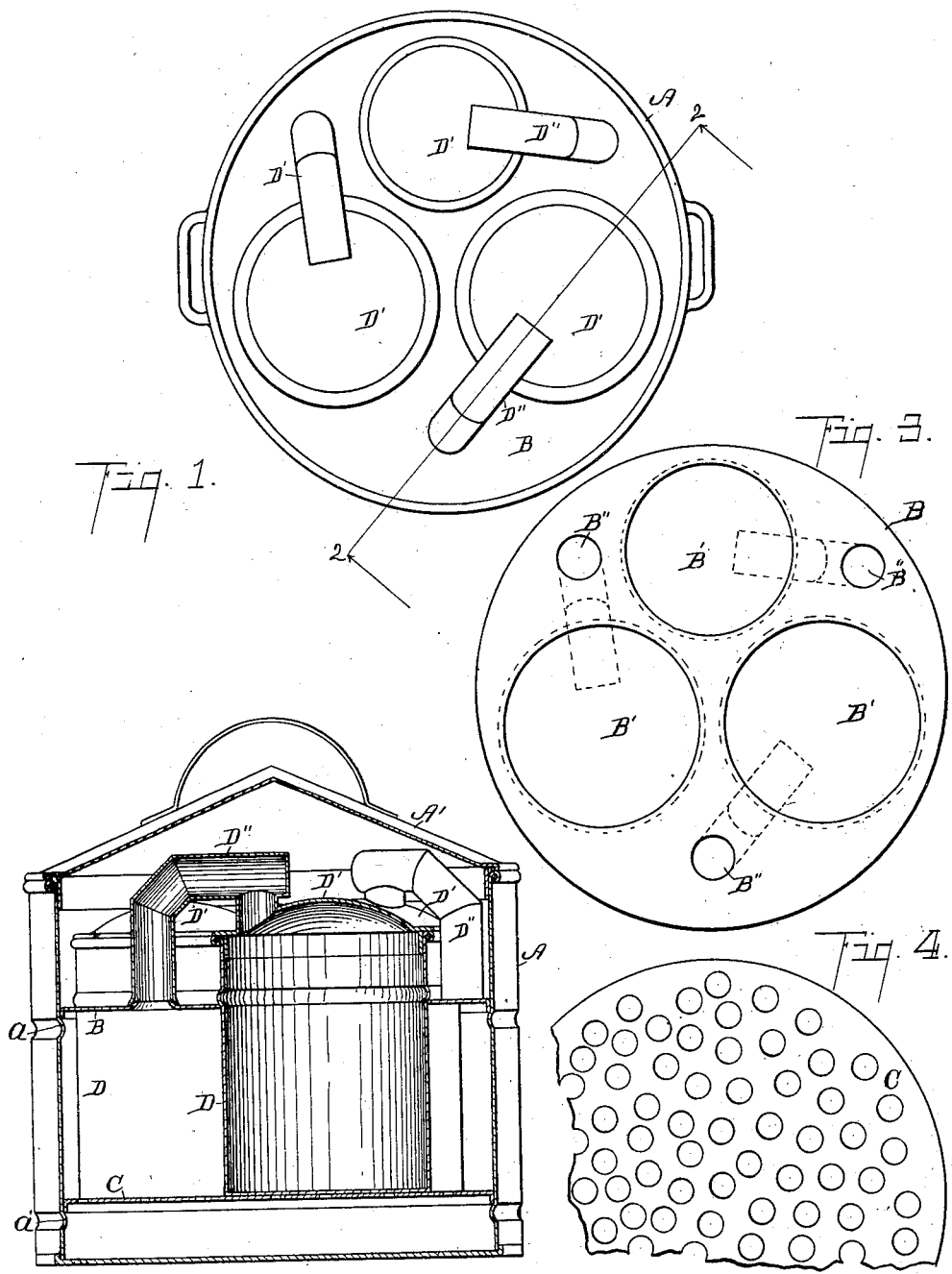

No. 735,806. PATENTED AUG. 11, 1903.
E. C. PETERS.
STEAM COOKER.
APPLICATION FILED JULY 7, 1902.
NO MODEL.

Witnesses:
D. Ellwood
Otis A. Earl

Inventor,
Edna C. Peters,
By Fred L. Chappell
Att'y.

No. 735,806. Patented August 11, 1903.

UNITED STATES PATENT OFFICE.

EDNA C. PETERS, OF ECKFORD, MICHIGAN.

STEAM-COOKER.

SPECIFICATION forming part of Letters Patent No. 735,806, dated August 11, 1903.

Application filed July 7, 1902. Serial No. 114,589. (No model.)

*To all whom it may concern:*

Be it known that I, EDNA C. PETERS, a citizen of the United States, residing at the village of Eckford, in the county of Calhoun and State of Michigan, have invented certain new and useful Improvements in Steam-Cookers, of which the following is a specification.

This invention relates to improvements in steam-cookers.

The objects of the invention are, first, to provide an improved steam-cooker in which two or more varieties of food may be cooked without the odors of one tainting or contaminating the other; second, to provide an improved steam-cooker of the class described which shall be simple in its construction and compact in its arrangement; third, to provide an improved steam-cooker which is especially economical to construct and convenient to use.

Further objects will definitely appear in the detailed description to follow.

I accomplish the objects of my invention by the devices and means described in the following specification.

The invention is clearly defined, and pointed out in the claims.

A structure embodying the features of my invention is fully illustrated in the accompanying drawings, forming a part of this specification, in which—

Figure 1 is a plan view of a structure embodying the features of my invention. Fig. 2 is a vertical detail sectional view taken on line 2 2 of Fig. 1 looking in the direction of the little arrows at the ends of the section-line. Fig. 3 is an inverted plan view of a partition-plate B, the relation of the parts being indicated by dotted lines. Fig. 4 is a detail plan view of the perforated partition-plate C.

In the drawings similar letters of reference refer to similar parts throughout the several views.

Referring to the lettered parts of the drawings, A represents the main vessel or receptacle, and A' is the cover thereof. The walls of the vessel A are preferably creased, as at $a\ a'$, to support the partition-plates B and C in position. The partition-plate C is provided with numerous perforations and is adapted to support the individual receptacles D and to form a water-chamber beneath. The partition-plate B is formed with openings B' to receive the individual receptacles D and hold them in position and to form a steam-chamber above the water-chamber. The individual or single receptacles are provided with covers D', to which are secured steam-pipes D''. These steam-pipes D'' are bent outwardly and downwardly and are arranged to register with suitable openings B'' in the partition-plate B, so that the heated steam is delivered into the cooking vessels. These pipes serve also as suitable vents for the receptacles. With this arrangement the steam surrounds each of the cooking-receptacles and an equal amount of heat is delivered to each of the cooking vessels, and they are so arranged as to occupy a minimum amount of space. It is also apparent that the entire apparatus can be readily taken apart for the purpose of cleaning and that it is very light to handle and may be constructed very economically.

If desired, the single cooking-receptacles and partition-plate B may be removed and the vessel A used for preserving fruit and the like, the cans resting upon the partition-plate C.

I have illustrated and described my improved cooking utensil in the form preferred by me on account of its simplicity in construction and use. I desire to state that I am aware that it is capable of considerable structural variation without departing from my invention.

Having thus described my invention, what I claim as new, and desire to secure by Letters Patent, is—

1. In a steam-cooker, the combination of a receptacle A having a suitable cover; a perforated partition-plate C arranged toward the bottom of the same to form a water-chamber; a partition-plate B having openings B' B'' therein, arranged toward the top of said receptacle A to form a steam-chamber; individual cooking vessels D adapted to be inserted through the openings B' in said plate B and rest upon said plate C; covers D' for said cooking vessels having pipes D'' secured thereto, said pipes D'' being arranged to register with the perforations B'' in said plate B, all coacting for the purpose specified.

2. In a steam-cooker, the combination of a receptacle A; a partition-plate arranged toward the top thereof to form a steam-chamber; cooking-receptacles extending into said steam-chamber through suitable perforations in said partition-plate; covers for said cooking-receptacles having pipes connected thereto, said pipes being arranged to register with suitable perforations in said partition-plate, as specified.

3. In a steam-cooker, the combination of a main receptacle; a partition-plate arranged therein to form a steam-chamber; cooking-receptacles extending into said steam-chambers through suitable openings in said partition-plate; and passages connecting said steam-chamber with said cooking-receptacles, for the purpose specified.

In witness whereof I have hereunto set my hand and seal in the presence of two witnesses.

EDNA C. PETERS. [L. S.]

Witnesses:
 EARL J. FELLOWS,
 ROY D. GARDNER.